Figure 1:
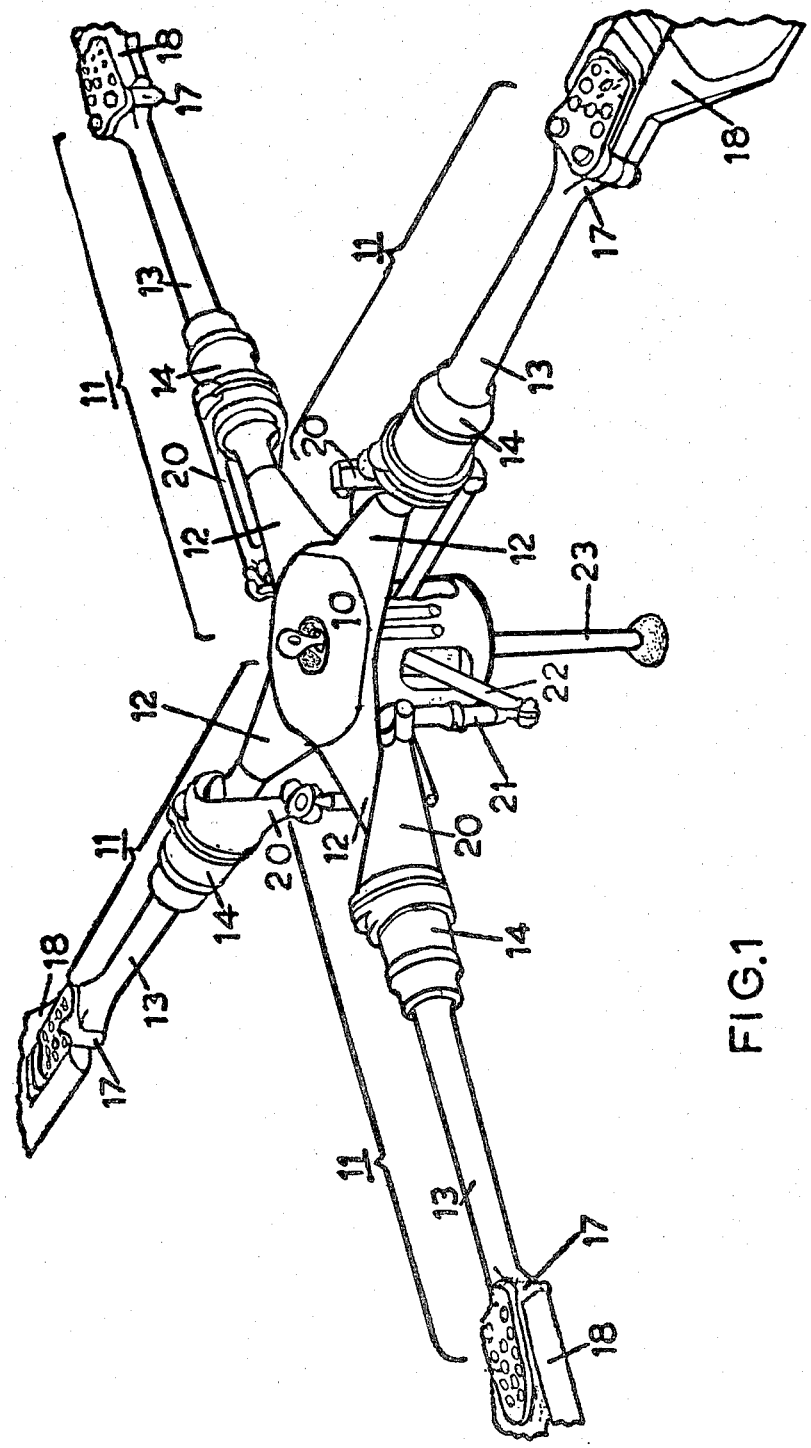

United States Patent [19]
Ciastula et al.

[11] 3,926,536

[45] Dec. 16, 1975

[54] SEMI-RIGID ROTOR SYSTEMS FOR ROTARY WING AIRCRAFT

[75] Inventors: Tadeusz Leopold Ciastula, Yeovil; Victor Alfred Baden Rogers; David Ernest Hall Balmford, both of Sherborne, all of England

[73] Assignee: Westland Aircraft Ltd., Yeovil, England

[22] Filed: Jan. 18, 1974

[21] Appl. No.: 434,482

Related U.S. Application Data

[63] Continuation of Ser. No. 188,329, Oct. 12, 1971, abandoned.

[30] Foreign Application Priority Data

Oct. 15, 1970 United Kingdom............... 49006/70

[52] U.S. Cl. ................. 416/135; 416/138; 416/141
[51] Int. Cl.²........................................ B64C 27/38
[58] Field of Search ........... 416/135, 138, 140, 141, 416/103

[56] References Cited

UNITED STATES PATENTS

| | | | |
|---|---|---|---|
| 3,026,942 | 3/1962 | Cresap .......................... | 416/135 UX |
| 3,232,349 | 1/1966 | Ballauer ....................... | 416/141 UX |
| 3,280,918 | 10/1966 | Drees et al. .................. | 416/135 UX |
| 3,460,628 | 8/1969 | Tankersley ................... | 416/141 UX |

FOREIGN PATENTS OR APPLICATIONS 1,442,684   5/1966   France ............................... 416/141

*Primary Examiner*—Everette A. Powell, Jr.
*Attorney, Agent, or Firm*—Larson, Taylor & Hinds

[57] ABSTRACT

This invention discloses a semi-rigid rotor system for a rotary wing aircraft, wherein each of a plurality of flexure members extends outwardly from a rotor hub, each flexure member comprising inner and outer parts joined by a feathering hinge, each outer part being adapted for attachment of a rotor blade.

7 Claims, 3 Drawing Figures

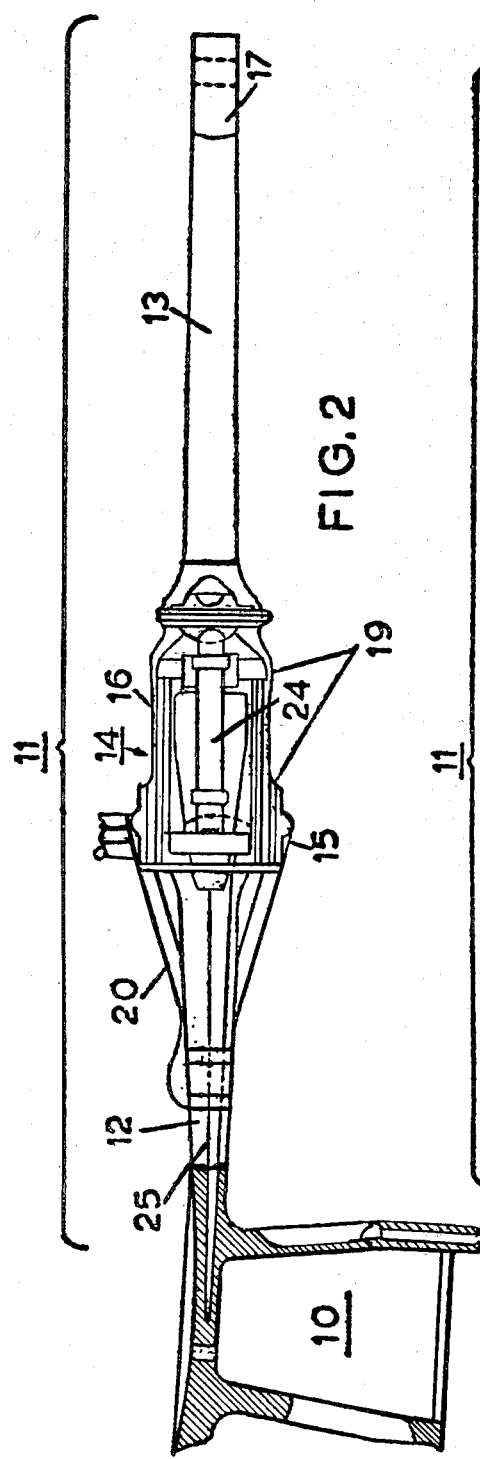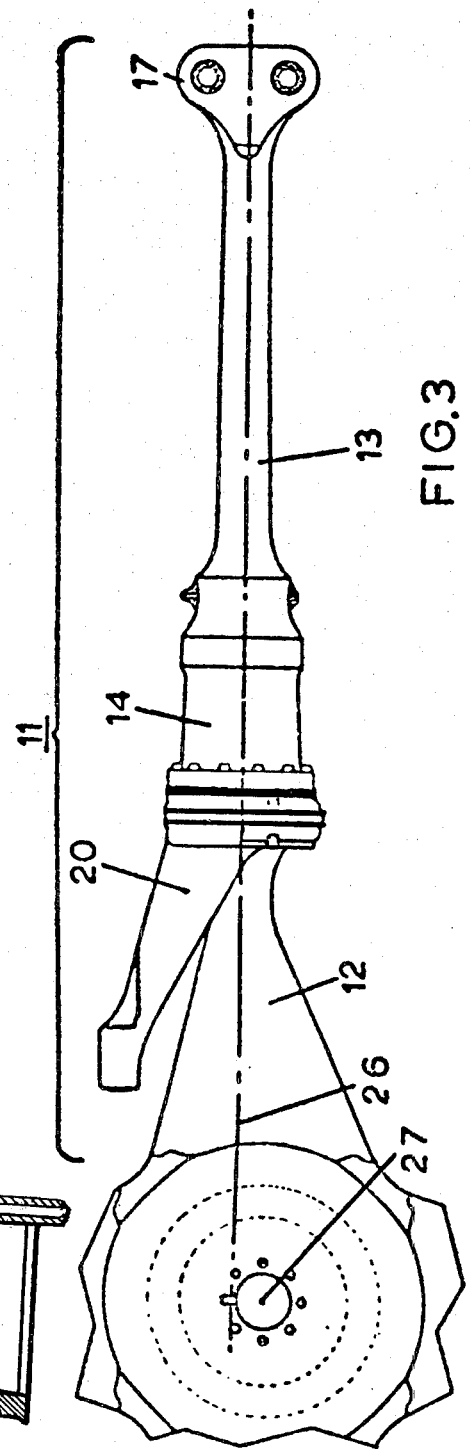

SEMI-RIGID ROTOR SYSTEMS FOR ROTARY WING AIRCRAFT

This is a continuation, of application Ser. No. 188,329 filed Oct. 12, 1971, now abandoned.

This invention relates to semi-rigid rotor systems for rotary wing aircraft.

By a semi-rigid rotor system we mean a rotor system devoid of mechanical flap and lead-lag hinges at the interconnection between each of a plurality of rotor blades and a rotor hub, the hinges being replaced by flexure members having suitable elastic bending characteristics which permit a necessary degree of movement of the rotor blades in the flapping and lead-lag planes. Feathering hinges are provided to allow changes of pitch of the rotor blades to be effected.

The advantages of a semi-rigid rotor system include lower cost resulting from simplicity of construction, a reduction in weight, and ease of maintenance.

In accordance with the instant invention we provide a semi-rigid rotor system devoid of mechanical flap and lead/lag hinges for a rotary wing aircraft, including a rotor hub, and a plurality of flexure members rigidly fixed thereto and extending outwardly therefrom, each flexure member comprising inboard and outboard parts connected through a feathering hinge, each inboard part being rigidly fixed to the hub and being resilient relative to its outboard part in a plane generally normal to the plane of rotation of the members and extending between the rotor hub and the feathering hinge such that the major portions of blade flapping movements are accommodated by the flexure members, the majority of which accommodated flapping movements are accommodated by resilient flexing of the inboard parts of the flexure members, each outboard part being substantially equally resilient in a plane generally coincident with the plane of rotation of the members and in a plane generally normal to the plane of rotation of the members, but being resilient relative to its inboard part in a plane generally coincident with the plane of rotation of the members and extending from the feathering hinge to terminate in an outer end adapted for the attachment of a rotor blade such that the major portions of blade lead/lag movements are accommodated by the flexure members, the majority of which accommodated lead/lag movement is accommodated by resilient flexing of the outboard parts of the flexure members, each feathering hinge being adapted to effect rotation of In another aspect, in accordance with the invention, we provide, in a rotary wing aircraft, a semi-rigid rotor system devoid of mechanical flap and lead-lag hinges, comprising a rotor hub adapted for rotation about a generally vertical axis, a plurality of flexure members each rigidly fixed at one end to and extending radially from the hub, each flexure member having a rotor blade mounted at its outer end, each flexure member comprising inboard and outboard parts joined through a feathering hinge, the inboard parts being resilient relative to the outboard parts in a plane normal to the plane of rotation of the members such that the flexure members permit and accommodate at least the majority of flapping movement of the rotor blades, and the majority of the accommodated flapping movement is accommodated by the inboard parts, which extend between the hub and the feathering hinges, the outboard parts being resilient relative to the inboard parts in a plane coincident with the plane of rotation of the members such that the flexure members permit and accommodate at least the majority of lead/lag movement of the rotor blades and the majority of the accommodated lead/lag movement is accomodated by the outboard parpts, which extend between the feathering hinges and the rotor blade mountings, the outboard parts each being substantially equally resilient in both planes, and means for rotating the feathering hinges to effect pitch changes of the rotor blades.

Preferably the inboard parts are of unitary construction with the rotor hub. In an exemplary preferred construction, the inboard part tapers from a parallel sided cross section elongated in a plane coincident with the plane of rotation at the hub end to a circular cross-section at its outer end, and is relatively more resilient in a plane generally normal to the plane of rotation than in a plane generally coincident with the plane of rotation. In a preferred arrangement the outboard part is circular in cross section. It is also preferred that each inboard part extend from the rotor hub at an angle other than normal to the rotational plane to provide a built-in coning angle.

The invention will now be described by way of example only with reference to the accompanying drawings, in which:

FIG. 1 is a perspective view of a semi-rigid rotor system according to one embodiment of the invention, FIG. 2 is a part-sectioned side view through the rotor hub and one of the outwardly extending flexure members showing details of the feathering hinge arrangement, and FIG. 3 is a plan view of FIG. 2.

Referring now to FIG. 1, a rotor hub is generally shown at 10 and is adapted for connection to a rotor drive shaft at its lower end. Four flexure members 11 extend outwardly from the hub, each member comprising inner and outer parts 12 and 13 respectively, the inner and outer parts 12 and 13 being joined through feathering hinges 14.

In the example shown the inner parts 12 are of unitary construction with the hub 10, the unit being manufactured in the form of a forging. The outer parts 13 and the unit comprising the hub 10 and inner parts 12 are manufactured of titanium.

Each inner part 12 tapers from a substantially parallel sided section elongated in a horizontal plane at the hub end to a substantially circular section at its outboard end, the outboard end being extended, as shown at 15 (FIG. 2), to form the inner casing of each feathering hinge 14. Each outer part 13 is formed with a sleeve 16 at its inboard end, which constitutes the outer casing of the feathering hinges 14 (FIG. 2). The outer parts 13 are circular in and have suitably shaped outboard ends 17 provided with two bolt holes for the attachment of rotor blades 18 (FIG. 1).

Referring now to FIG. 2, bearing assemblies 19 are located in the feathering hinge 14 between the extension 15 of the inner part 12 and the sleeve 16 of the outer part 13, to enable the outer part 13 to be rotated relative the inner part 12, to provide what is generally known in rotary wing technique as collective and cyclic pitch changes. Rotation is effected through arms 20 moved through links 21 and a spider assembly 22 by an operating lever 23 (FIG. 1) which is connected to the helicopter controls (not shown). A torsion bar 24 (FIG. 2) is incorporated in each feathering hinge 14 to absorb centrifugal loads and control power loads due to changes of rotor blade pitch settings.

A built-in coning angle is incorporated into the rotor system, as shown in FIG. 2, where a line normal to the vertical centreline of the hub 10 is compared with the centreline of the member 11, the coning angle being indicated at 25. From the centreline 26 on FIG. 3 it will be seen that the flexure members 11 are offset from the axis of rotation of the hub indicated at 27.

In operation as a complete rotor system, the inner parts 12 of the flexure members 11 respond to the flapping deflections of the rotor blades by the elastic bending characteristics and shape of the member. Flexing to permit lead and lag movements of the rotor blades is shared between the outer (circular section) end of the inner parts 12 and the outer parts 13 to which the rotor blades 18 are attached.

It will be clear, therefore, that the inner parts 12, providing the flapping movements, are positioned inboard of the feathering hinges 14 and that their inner ends are positioned as near as structurally possible to the rotor drive shaft axis 27. This design feature is effective to minimise the increase of control power of the semi-rigid rotor over the articulated type in order to contain within acceptable limits the less desirable features of high control power, such as pitching moments and oscillation. The disposition of each feathering hinge 14 ensures that the axis of the hinge is following reasonably closely the deflection of the blade, thereby ensuring that changes of blade pitch due to lag motion will be minimised, thus reducing the blade lag plane damping requirement to suppress pitch-lag instability whilst maintaining desirable response characteristics.

Although the majority of the lag plane bending deflection is taking place outboard of the feathering hinge 14, the matched stiffness concept outboard of the feathering hinge achieved by the use of a circular cross-section for the outer parts 13 ensures that no adverse pitching moments and deflections are caused by blade flap and lag movements. The disposition of the inner and outer parts 12 and 13 of the flexure members 11 relative the feathering hinges 14 ensures that no torsional moments are taken onto the inner part 12 which is flexible in torsion, hence enabling a high fundamental torsional natural frequency of the blade to be achieved, this being a very desirable feature from an aeroelastic point of view.

This invention virtually separates the dependence of fundamental flap and lead-lag frequencies on the stiffness value of a single structural element by controlling them within separate inner and outer parts 12 and 13 respectively of flexure members 11. In addition, the critical root end stressing of the rotor blades is largely divorced from the problems of obtaining the required fundamental flap and lead-lag frequencies. Our rotor system shows an improvement in handling and stability by giving an improved response to control inputs combined with an increase in aerodynaimc damping.

Although one embodiment of the invention has been described and illustrated, it is to be understood that modifications can be made within the scope of the invention as defined in the following claims. For instance, the inner parts 12 can be manufactured separately and attached to the rotor hub 10 by any suitable means such as bolting. Thrust bearings may be provided in each feathering hinge 14 in addition to the bearing assemblies 19, to improve the structural integrity of the assembly. Any material having suitable properties may be used in the manufacture of the inner and outer parts 12 and 13 respectively of the flexure members 11.

We claim as our invention:

1. A semi-rigid rotor system devoid of mechanical flap and lead-lag hinges for a rotary wing aircraft including a rotor hub, and a plurality of flexure members rigidly fixed thereto and extending outwardly therefrom, each said flexure member comprising inboard and outboard parts connected through a feathering hinge, each said inboard part being rigidly fixed to said hub and being resilient relative to its outboard part in a plane generally normal to the plane of rotation of the members and extending between the rotor hub and the feathering hinge such that the major portions of blade flapping movements are accommodated by the flexure members, the majority of which accommodated flapping movements are accommodated by resilient flexing of the inboard parts of the flexure members, each said outboard part being substantially equally resilient in a plane generally coincident with the plane of rotation of the member and in a plane generally normal to the plane of rotation of the members, but being resilient relative to its inboard part in a plane generally coincident with the plane of rotation of the members and extending from the feathering hinge to terminate in an outer end adapted for the attachment of a rotor blade such that the major portions of blade lead/lag movements are accommodated by the flexure members, the majority of which accommodated lead/lag movement is accommodated by resilient flexing of said outboard parts of the flexure members, each feathering hinge being adapted to effect rotation of the outboard part about its longitudinal axis.

2. A rotor system according to claim 1, wherein said inboard parts are of unitary construction with the rotor hub.

3. A rotor system according to claim 1, wherein each said inboard part extends from the rotor hub at an angle other than normal to the rotational plane to provide a built-in coning angle.

4. A rotor system according to claim 1, wherein each said inboard part is relatively more resilient in a plane generally normal to the plane of rotation than in a plane generally coincident with the plane of rotation.

5. In a rotary wing aircraft, a semi-rigid rotor system devoid of mechanical flap and lead-lag hinges comprising a rotor hub adapted for rotation about a generally vertical axis, a plurality of flexure members each rigidly fixed at one end to and extending radially from the hub, each flexure member having a rotor blade mounted at its outer end, each flexure member comprising inboard and outboard parts joined through a feathering hinge, the inboard parts being resilient relative to the outboard parts in a plane normal to the plane of rotation of the members such that the flexure members permit and accommodate at least the majority of flapping movement of the rotor blades, and the majority of said accommodated flapping movement is accommodated by said inboard parts, which extend between the hub and the feathering hinges, the outboard parts being resilient relative to the inboard parts in a plane coincident with the plane of rotation of the members such that the flexure members permit and accommodate at least the majority of lead/lag movement of the rotor blades and the majority of said accommodated lead/lag movement is accommodated by said outboard parts, which extend between the feathering hinges and the rotor blade mountings, said outboard parts each being substantially equally resilient in both planes, and means for rotating the feathering hinges to effect pitch changes of the rotor blades.

6. A semi-rigid rotor system for a rotary wing aircraft including a rotor hub, and a plurality of flexure members extending outwardly therefrom, each said flexure member comprising inboard and outboard parts connected through a feathering hinge, each said inboard part being resilient relative to its outboard part in a plane generally normal to the plane of rotation of the members and extending between the rotor hub and the feathering hinge such that the major portions of blade flapping movements are accommodated by the flexure members, the majority of which accommodated flapping movements are accommodated by resilient flexing of the inboard parts of the flexure members, each said inboard part tapering from a parallel sided cross-section elongated in a plane coincident with the plane of rotation at the hub end to a circular cross-section at its outer end, and being relatively more resilient in a plane generally normal to the plane of rotation than in a plane generally coincident with the plane of rotation, each said outboard part being resilient relative to its inboard part in a plane generally coincident with the plane of rotation of the members and extending from the feathering hinge to terminate in an outer end adapted for the attachment of a rotor blade such that the major portions of blade lead/lag movements are accommodated by the flexure members, the majority of which accommodated lead/lag movement is accommodated by resilient flexing of said outboard parts of the flexure members, each feathering hinge being adapted to effect rotation of the outboard part about its longitudinal axis.

7. A rotor system according to claim 6 wherein each said outboard part is circular in cross-section.

* * * * *